United States Patent [19]

Mazanek et al.

[11] Patent Number: 4,929,705

[45] Date of Patent: May 29, 1990

[54] NEW POLYISOCYANATE-POLYADDITION COMPOUNDS, A PROCESS FOR THEIR PREPARATION AND THEIR USE FOR THE DISPERSION OF SOLIDS

[75] Inventors: Jan Mazanek, Cologne; Ulrich von Gizycki, Leverkusen; Hanns P. Müller, Bergisch-Gladbach; Martin Wienkenhöver; Karl-Heinz Wieser, both of Leverkusen; Volker Paulat, Monheim; Werner Theuer; Walter Müller, both of Leverkusen, all of Fed. Rep. of Germany

[73] Assignee: Bayer Aktiengesellschaft, Leverkusen, Fed. Rep. of Germany

[21] Appl. No.: 329,462

[22] Filed: Mar. 28, 1989

[30] Foreign Application Priority Data

Mar. 30, 1988 [DE] Fed. Rep. of Germany ....... 3810781

[51] Int. Cl.$^5$ .............................................. C08G 18/30
[52] U.S. Cl. ...................................................... 528/49
[58] Field of Search ........................................... 528/49

[56] References Cited

U.S. PATENT DOCUMENTS

| | | | |
|---|---|---|---|
| 4,631,330 | 12/1986 | Dietz et al. ........................... | 528/49 |
| 4,647,647 | 3/1987 | Haubennestel et al. .............. | 528/83 |
| 4,762,752 | 8/1988 | Haubennestel et al. ............. | 428/407 |
| 4,795,796 | 1/1989 | Haubennestel et al. .............. | 528/28 |

FOREIGN PATENT DOCUMENTS

| | | |
|---|---|---|
| 0154678 | 9/1985 | European Pat. Off. . |
| 0194349 | 9/1986 | European Pat. Off. . |
| 0270126 | 6/1988 | European Pat. Off. . |

*Primary Examiner*—Maurice J. Welsh
*Attorney, Agent, or Firm*—Sprung Horn Kramer & Woods

[57] ABSTRACT

New polyisocyanate-polyaddition compounds, a process for their preparation and their use as wetting or dispersing agents for the incorporation of solids, in particular pigments, in lacquer or synthetic resin formulation.

26 Claims, No Drawings

NEW POLYISOCYANATE-POLYADDITION COMPOUNDS, A PROCESS FOR THEIR PREPARATION AND THEIR USE FOR THE DISPERSION OF SOLIDS

The present invention relates to polyisocyanate-polyaddition compounds which may be used as wetting or dispersing agents for the incorporation of solids, in particular pigments, in lacquer or synthetic resin formulation. The invention further relates to a process for the preparation of these polyisocyanate-polyaddition compounds and to their use for the dispersion of solids in lacquer and/or synthetic resin formulations and for the surface modification of solids before their incorporation in dispersions.

The dispersion of pigments in lacquer systems requires powerful shearing forces for breaking down the existing aggregations of pigments and ensuring that the primary pigment particles will be present as far as possible in a monodisperse form in the dispersion. This process of dispersion depends to a large extent on the ability of the lacquer system to wet the pigment and the affinity of the pigment to this lacquer system.

Pigmented lacquer systems are required to be stable, i.e. they must not re-agglomerate. Any re-agglomeration of the finely divided pigment would impair the colouristic properties and lead to problems of gloss and viscosity and insufficient development of colouring power in lacquers and coatings.

Dispersing agents prepared from polyisocyanates by a reaction with tertiary amines and mono- and polyfunctional polyethers and esters containing hydroxyl groups in quantities equivalent to the isocyanate groups are already known (see e.g. EP-OS No. 154,678 and DE-OS No. 3,542,437). It is explicitly stated in EP-OS No. 154,678 that excessive cross-linking or the use of a sub-equivalent quantity of tertiary amines and mono- and polyfunctional polyethers and polyesters containing hydroxyl groups must be avoided (see page 12, lines 11 to 15 and 28 to 29).

The nature and quantity of the dispersing agent must be determined empirically in each case for the particular pigment/lacquer system if optimum results are to be obtained (see EP-OS No. 154,678, page 14, lines 16 to 20). These dispersing agents, which differ from the dispersing agents according to the invention, do not produce a positive result with all pigments and all lacquer systems. In many cases, no improvement is achieved or indeed the opposite effect to that required is obtained. This is a fundamental disadvantage since mixtures of pigments are in most cases used for the preparation of lacquers. The different pigment components are then in many cases not equally well dispersed.

Polyisocyanate-polyaddition compounds have now been found which are characterised in that they are obtainable by the reaction of polyisocyanates containing 3 to 8 isocyanate groups per molecule with (A) from 5 to 60 equivalents % (based on the isocyanate groups of the polyisocyanates put into the process) of one or more compounds corresponding to the following formulae:

$$R_1\text{-}(AO)_x\text{-}X \qquad (I)$$

and/or $$R_1\text{-}R_2\text{-}X \qquad (II)$$

in which $R_1$ denotes an optionally substituted aliphatic group containing 1 to 60 carbon atoms, an optionally substituted aromatic or araliphatic group containing 6 to 60 carbon atoms and/or the residue of a carboxylic acid, of a carboxylic acid derivative or of a sulphonamide, in each case containing from 1 to 60 carbon atoms, AO denotes an alkylene oxide group containing 2 to 22 carbon atoms, x stands for a number from 0 to 200, X denotes a HO, HS, $H_2N$ or HRN group in which $R=C_1$ to $C_6$ alkyl and $R_2$ denotes an aliphatic polyester group having a molecular weight of from 200 to 10,000, (B) from 20 to 80 equivalents % (based on the isocyanate groups of the polyisocyanates put into the process) of a tertiary amine containing 3 to 20 carbon atoms and in addition containing a HO, HS, $H_2N$ or HRN group wherein $R=C_1$ to $C_6$ alkyl, and (C) optionally further components, the sum of (A)+(B) amounting to 40 to 98 equivalents % (based on the isocyanate groups of the polyisocyanates put into the process). The additional components of type (C) optionally used may consist, for example, of (i) from 0 to 40 equivalents % (based on the isocyanate groups of the polyisocyanates) of one or more compounds corresponding to the formula $$X\text{-}R_3\text{-}X \qquad (III)$$

wherein $R_3$ denotes a group which formally is obtained by removal of the two terminal OH groups from a bifunctional polyether or polyester having a molecular weight of from 200 to 10,000 and X in each case denotes, independently of the other and independently of the meaning of X in formulae (I) and (II), a HO, HS, $H_2N$ or HRN group wherein $R=C_1$ to $C_6$ alkyl, and/or (ii) from 0 to 30 equivalents % (based on the isocyanate groups of the polyisocyanates put into the process) of a monofunctional carboxylic acid containing 2 to 40 carbon atoms and/or (iii) from 0 to 50 equivalents % (based on the isocyanate groups of the polyisocyanates put into the process) of a polyfunctional compound corresponding to the following formula $$R_4\text{-}(X)_y \qquad (IV)$$

wherein $R_4$ stands for a group which formally is obtained by the removal of y HO groups from a polyether polyol, polyester polyol or polyacrylate polyol containing at least y HO groups and having a molecular weight of from 176 to 200,000, X in each case denotes, independently of the other and independently of the meaning of X in formulae (I), (II) and (III), an HO, HS, $H_2N$ or HRN group wherein $R=C_1$ to $C_6$ alkyl, and y stands for a number from 3 to 20, and/or (iv) from 0.0001 to 10% by weight (based on the total quantity of compounds put into the process which contain isocyanate reactive hydrogen atoms) of one or more catalysts and/or (v) solvents, the sum of (A)+(B)+(Ci)+(Cii) being from 40 to 98 equivalents % and the sum of (A)+(B)+(Ci)+(Cii)+(Ciii) being from 50 to 98 or from 102 to 150 equivalents % (based in each case on the isocyanate groups of the polyisocyanate put into the process).

Preferred polyisocyanate-polyaddition compounds according to the invention are obtainable by using the following quantities of the components previously indicated, in which case only one or several or all these preferred quantitative ranges may be used simultaneously (the equivalents % refer to the isocyanante groups of the polyisocyanates used unless otherwise indicated):

(Component A): from 10 to 50. in particular from 15 to 35 equivalents %. Preferably, either a compound of formula (1) or a compound of formula (II) or a mixture of a compound of formula (1) with a compound of formula (11) is used and the components are present in a molar ratio of from 9:1 to 1:9, preferably from 7:3 to 3:7.

(Component B): from 20 to 75, in particular from 30 to 60 equivalents %.

(Component Ci): from 0 to 40, in particular from 5 to 30 equivalents %.

(Component Cii): from 0 to 30, in particular from 0 to 15 equivalents %.

(Component Ciii): from 0 to 40, in particular from 0 to 20 equivalents %.

(Component Civ): from 0.0005 to 5, in particular from 0.001 to 3% by weight (based on the total quantity of compounds containing isocyanate reactive hydrogen atoms put into the process).

The sum of (A)+(B)+(Ci)+(Cii)+(Ciii) is preferably from 50 to 90 equivalents % or from 110 to 140 equivalents %, in particular from 60 to 80 equivalents %.

The polyisocyanates containing 3 to 8 isocyanate groups per molecule may be any polyisocyanates of this type.

Polyisocyanates which are obtainable from mono- and/or diisocyanates by trimerisation, biuretisation or allophanatisation reactions in known manner are particularly suitable. lsocyanates containing from 3 to 8 isocyanate groups per molecule obtainable by the reaction of mono- and diisocyanates with polyhydroxyl compounds are also particularly suitable. Any of the polyisocyanates described below which have from 3 to 8 isocyanate groups per molecule may be used directly for the preparation of the addition compounds according to the invention. Suitable polyisocyanates may also be obtained from any of the isocyanates described below by carrying out the above mentioned reactions for the preparation of polyaddition compounds according to the invention (i.e. trimerisation, biuretisation or allophanatisation reactions). The polyisocyanates may be aliphatic, cycloaliphatic, araliphatic, aromatic or heterocyclic polyisocyanates such as those described, for example, by W. Siefken in Justus Liebigs Annalen der Chemie, 562, pages 75 to 136, for example those corresponding to the following formula:

wherein n denotes a number from 2 to 4, preferably from 2.0 to 3.0, and

Q denotes an aliphatic hydrocarbon group containing from 2 to 18, preferably from 6 to 10 carbon atoms or a cycloaliphatic hydrocarbon group containing from 4 to 15, preferably from 5 to 10 carbon atoms or an aromatic hydrocarbon group containing from 6 to 20, preferably from 6 to 13 carbon atoms or an araliphatic hydrocarbon group containing from 8 to 15, preferably from 8 to 13 carbon atoms.

The following are examples of such polyisocyanates: ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate and any mixtures of these isomers, 1-isocyanato-3,3,5-trimechyl-5-isocyanatomethyl-cyclohexane (see DE-AS No. 1,202,785 and U.S. Pat. No. 3,401,190), 2,4- and 2,6-hexahydrotolylene diisocyanate and any mixtures of these isomers, hexahydro-1,3- and/or -1,4-phenylene diisocyanate, perhydro-2,4'- and/or -4,4'-diphenylmethane diisocyanate, 1,3- and 1,4-phenylene diisocyanate, 2,4- and 2,6-tolylene diisocyanate and any mixtures of these isomers, diphenyl methane-2,4'- and -4,4'-diisocyanate and naphthylene-1,5-diisocyanate.

The following are further examples: triphenylmethane-4,4',4''-triisocyanate, polyphenyl-polymethylene polyisocyanates of the type obtainable by aniline-formaldehyde condensation followed by phosgenation as described e.g. in GB-PS Nos. 874 430 and 848 671, m- and p-isocyanatophenyl sulphonyl isocyanates (see e.g. U.S. Pat. No. 3,454,606), perchlorinated aryl polyisocyanates (see e.g. DE-AS No. 1,157,601 and U.S. Pat. No. 3,277,138), polyisocyanates containing carbodiimide groups (see e.g. DE-PS No. 1,092,007 and U.S. Pat. No. 3,152,162), norbornane diisocyanates (see e.g. U.S. Pat. No. 3,492,330), polyisocyanates containing allophanate groups (see e.g. GB-PS No. 994,890, BE-PS No. 761,626 and NL Patent application No. 7,102,524), polyisocyanates containing isocyanurate groups (see e.g. U.S. Pat. No. 3,001,973 and DE-PS Nos. 1,022,789, 1,222,067 and 1,027,694 and DE-OS Nos.1,929,034 and 2,004,048), polyisocyanates containing urethane groups (see e.g. BE-PS No. 752,261 and U.S. Pat. Nos. 3,394,164 and 3,644,457), polyisocyanates containing acylated urea groups (see e.g. DEPS No. 1,230,778), polyisocyanates containing biuret groups (see e.g. U.S. Pat. Nos. 3,201,372 and 3,124,605 and GB-PS No. 889,050), polyisocyanates prepared by telomerisation reactions (see e.g. U.S. Pat. No. 3,654,106), polyisocyanates-containing ester groups (see e.g. GB-PS Nos. 9,654,74 and 1,072,956 and U.S. Pat. No. 3,567,763 and DE-PS No. 1,231,688), reaction products of the above mentioned isocyanates with acetals (see e.g. DE-PS No. 1,072,385) and polyisocyanates containing polymeric fatty acid esters (see e.g. U.S. Pat. No. 3,455,883).

Distillation residues containing isocyanate groups from the commercial production of isocyanates may also be used, optionally dissolved in one or more of the above mentioned polyisocyanates. Any mixtures of the above mentioned polyisocyanates may be used.

It is preferred to use commercially readily available polyisocyanates, e.g. 2,4 and/or 2,6-tolylene diisocyanate and any mixtures of these isomers ("TDI"), hexamethylene diisocyanate, polyphenyl-polymethylene polyisocyanates obtainable by anilineformaldehyde condensation followed by phosgenation ("crude MDI") and polyisocyanates containing carbodiimide groups, urethane groups, allophanate groups, isocyanurate groups, urea groups or biuret groups ("modified polyisocyanates"), in particular modified polyisocyanates which are derived from 2,4- and/or 2,6-tolylene diisocyanate and from 4,4'- and/or 2,4'-diphenyl methane diisocyanate.

The polyisocyanates (A) may be used in a free or a partially masked form. Phenols, acid amides and in particular caprolactam, oximes and enol compounds, for example, may be used for masking.

Compounds of formulae (I) and (II) are preferably monohydroxyl compounds (X=H). The compounds of formula (I) are in the main alkoxylates and esters of alcohols, phenols, carboxylic acids, carboxylic acid amides, secondary amides and sulphonamides.

Suitable alcohol components are, for example, saturated and unsaturated aliphatic, cycloaliphatic and araliphatic hydroxyl compounds containing, for example, from 1 to 30 carbon atoms. The alcohols preferably contain from 8 to 25 carbon atoms and are present in a pure form or as mixtures of the kind obtainable, for example, by the reduction of fatty acids or fatty acid esters present in plant oils such as coconut oil, ground nut oil, palm oil, soya bean oil, linseed oil, corn oil or castor oil or in animal oils and fats such as fish oil, whale oil, tallow or lard, or by oxosynthesis, by the Ziegler process or by paraffin oxidation. The following are examples: 1-octanol, isooctanol, 2-ethyl-1-hexanol, 2-ethyl-4-methyl-pentanol-(1), 2,2-dimethyl-1-hexanol, 1-nonanol, 2,4,4- and 3,5,5-trimethyl-1-hexanol and mixtures of these isomers, 1-decanol, 1-dodecanol, isododecanol, isotridecanol, 1-tetradecanol, 1-hexadecanol, isohexadecanol, 1-octadecanol, isooctadecanol, 3,3,5-trimethyl-cyclohexanol, 4-tert.-butyl-cyclohexanol, 2-hydrodecaline, 1,7,7-trimethyl-norbornanol(2), oleyl alcohol, eicosenyl alcohol, benzyl alcohol, 1- and 2-phenyl ethanol and 2-phenyl-1-propanol. Partially fluorinated and perfluorinated alcohols such as heptadecafluorododecanol and tetradecafluoroctanol may also be used.

Suitable phenol components include, for example, phenol itself, mono and polyhalogenated phenols, naphthols, 2- and 4-hydroxy diphenyl, 3-benzyl-4-hydroxy diphenyl, phenols alkylated with 1 to 15 carbon atoms such as cresols, ethyl phenols and phenols alkylated with 6 to 15 carbon atoms such as isooctyl phenol, nonyl phenols and dodecyl phenols and phenols aralkylated with 8 to 36 carbon atoms.

Examples of acids which can be alkoxylated include saturated and unsaturated aliphatic carboxylic acids, for example with 1 to 30 carbon atoms. Those containing 10 to 22 carbon atoms are preferred, such as carpic, lauric, palmitic, stearic, behenylic, rizinoleic, rizinenic, linoleic and linolenic acid. Mixtures of saturated and/or unsaturated aliphatic carboxylic acids of the kind obtained from paraffin oxidation and oxosynthesis or from the saponification of vegetable or animal fats are also suitable. Cycloaliphatic and aromatic carboxylic acids may also be used for alkoxylation, preferably those containing from 10 to 22 carbon atoms, such as cyclohexane carboxylic acid, abietic acid, tertiary butyl benzoic acid and p-nonyl benzoic acid.

Acid amides may also be used for alkoxylation, for example the amides of the carboxylic acids described above and the corresponding alkyl sulphonamides.

For the preparation of alkoxylates of formula (1), the compounds which are to be alkoxylated may be reacted with alkylene oxides by known processes. The alkylene oxides used are preferably ethylene oxide, propylene oxide, 1,2- and 2,3-epoxibutane, 2,3-epoxipentane, styrene oxide and epichlorohydrin. Ethylene oxide and propylene oxide are particularly preferred.

Monofunctional esters of formula (11) may be prepared, for example, by the reaction of the monofunctional, low molecular weight compounds described above with cyclic esters, in particular with caprolactone, but they may also be obtained by the known method of preparation of hydroxy-carboxylic acids or bifunctional carboxylic acids and glycols in the presence of the monofunctional compounds described above.

The compounds corresponding to formula (III) and formula (IV) are preferably of the kind in which X stands for OH and which have molecular weights of from 350 to 50,000.

Polyesters containing hydroxyl groups are particularly suitable; for example, reaction products of polyhydric, preferably dihydric and/or trihydric alcohols with polybasic, preferably dibasic carboxylic acids. Instead of the free polycarboxylic acids, the corresponding polycarboxylic acid anhydrides or corresponding polycarboxylic acid esters of lower alcohols or mixtures thereof may be used for the preparation of polyesters. The polycarboxylic acids may have aliphatic, cycloaliphatic, aromatic and/or heterocyclic structures and may be substituted, e.g. by halogen atoms, and/or unsaturated.

The following are specific examples of suitable polycarboxylic acids or derivatives thereof: succinic acid, adipic acid, suberic acid, azelaic acid, sebacic acid, phthalic acid, isophthalic acid, trimellitic acid, phthalic acid anhdyride, tetrahydrophthalic acid anhydride, hexahydrophthalic acid anhydride, tetrachlorophthalic acid anhydride, endomethylenetetrahydrophthalic acid anhydride, glutaric acid anhydride, maleic acid, maleic acid anhydride, fumaric acid, dimerised and trimerised unsaturated fatty acids optionally as mixtures with monomeric unsaturated fatty acids such as oleic acid, dimethyl terephthalate or terephthalic acid bisglycol esters. Examples of suitable polyhydric alcohols include ethylene glycol, propylene glycol-(1,2) and -(1,3), butylene glycol(1,4) and -(2,3), hexane diol-(1,6), octane diol-(1,8), neopentyl glycol, 1,4-bis-hydroxymethyl cyclohexane, 2-methyl-1,3-propane diol, glycerol, trimethylol propane, hexane triol-(1,2,6), butane triol-(1,2,4), trimethylol ethane, pentaerythritol, quinitol, manitol and sorbitol, formitol, methyl glycoside, diethylene glycol, triethylene glycol, tetraethylene glycol and higher polyethylene glycols, diisopropylene glycol and higher polypropylene glycols, diisobutylene glycol and higher polybutylene glycols. The polyesters may contain a proportion of carboxyl groups in end positions. Polyesters of lactones such as ε-caprolactone or of hydroxycarboxylic acids such as ω-hydroxycaproic acid may also be used.

Polyesters obtained by the (co)polymerisation of vinyl monomers containing hydroxyl groups may also be used, e.g. copolymers of 2-hydroxyethyl acrylate.

Among the polyethers of formula (III) or (IV) containing at least two hydroxyl groups, those which are suitable for the process according to the invention include, for example, the polyethers obtained by the polymerisation of epoxides such as ethylene oxide, propylene oxide, butylene oxide, tetrahydrofuran styrene oxide or epichlorohydrin, either on their own, e.g. in the presence of Lewis catalysts such as $BF_3$, or by the addition of these epoxides, preferably ethylene oxide and/or propylene oxide, to starting components containing reactive hydrogen atoms, such as water, alcohols, ammonia or amines, e.g. ethylene glycol, propylene glycol-(1,3) or -(1,2), trimethylol propane, glycerol, sorbitol, 4,4'-dihydroxy-diphenyl propane, aniline, ethanolamine or ethylene diamine. Sucrose polyethers (see DE-AS Nos. 1 176 358 and 1 064 938) and polyethers which have been started on formitol or formose (see DE-OS Nos. 2 639 083 and 2 737 951) may also be used. Polyethers and polyacrylate polyols containing up to 90% by weight of primary OH groups, based on all the OH groups present in the polyether, are preferred. Polybutadienes containing OH groups are also suitable.

The polyethers of formula (III) or (IV) may be, for example, products obtained by the condensation of thiodiglycol either on its own and/or with other glycols, dicarboxylic acids, formaldehyde, amino carboxylic acids or amino alcohols. The products obtained are then polythio mixed ethers, polythio ether esters or polythio ether ester amides, depending on the co-components.

Polyhydroxyl compounds already containing urethane or urea groups and modified or unmodified natural polyols such as castor oil or carbohydrates such as starch may also be used. Products of addition of alkylene oxides to phenol-formaldehyde resins or to urea-formaldehyde resins are also suitable.

The above mentioned polyhydroxyl compounds may be modified in various ways before they are used for the preparation of polyisocyanate polyaddition products according to the invention. According to DE-OS Nos. 2,210,893 and 2,544,195 and U.S. Pat. No. 3,849,515, for example, a relatively high molecular weight polyol composed of various segments connected by ether bridges may be obtained from a mixture of different polyhydroxyl compounds (for example a polyether polyol and a polyester polyol) by etherification in the presence of a strong acid. Amide groups may be introduced into the polyhydroxyl compounds (see DE-OS No. 2,559,372) or triazine groups may be introduced by a reaction with polyfunctional cyanic acid esters (see DE-OS No. 2,620,487). Polyhydroxyl compounds containing guanidine, phosphonoformamidine or acyl urea groups may be obtained by the reaction of a polyol with less than the equivalent quantity of a diisocyanatocarbodiimide followed by reaction of the carbodiimide group(s) with an amine, amide, phosphite or carborylic acid (see DE-OS No. 2,714,289, 2 714 292 and 2 714 293). Relatively high molecular weight polyhydroxyl compounds which have been partly or completely converted into the corresponding anthranilic acid esters by a reaction with isatoic acid anhydride may also be used (see, for example, DE-OS Nos. 2 019 438 and 2 619 840 and U.S. Pat. Nos. 3,808,250, 3,975,428 and 4,016,143). Relatively high molecular weight compounds containing terminal aromatic amino groups are obtained by these means.

It is in some cases advantageous to combine low melting with high melting polyhydroxyl compounds (see DE-OS No. 2,706,297).

The compounds of type (Cii) may be saturated or unsaturated aliphatic carboxylic acids containing, for example, 2 to 30, preferably 10 to 22 carbon atoms; for example, caproic, lauric, palmitic, stearic, behenic, ricinoleic, ricinenic, linoleic or linolenic acid or mixtures of saturated and/or unsaturated aliphatic carboxylic acids such as are obtained from paraffin oxidation or oxosynthesis or from the saponification of vegetable or animal fats. Cycloaliphatic and aromatic carboxylic acids, preferably with 16 to 22 carbon atoms, may also be used; for example, cyclohexane carboxylic acid, abietic acid, tert.-butyl benzoic acid and p-nonyl benzoic acid. Monofunctional polyesters containing terminal carboxyl groups and reaction products of compounds of formula (I) with cyclic anhydrides such as maleic acid anhydride, phthalic acid anhydride or hexahydrophthalic acid anhydride may also be used as compounds of type (Cii).

The compounds of type (B) may be, for example, substituted or unsubstituted heterocyclic or aliphatic or substituted or unsubstituted aromatic compounds. Examples of heterocyclic compounds include imidazole, morpholine, piperazine, triazole, pyrimidine, pyridine and benzimidazole. Heterocyclic compounds containing amino and/or hydroxyl groups are particularly suitable, e.g. 4-(2-hydroxyethyl)-pyridine, 4-(2-aminoethyl)-pyridine, 1-(3-aminopropyl)-imidazole, 1-(2-hydroxyethylimidazole), 2-hydroxyethylmorpholine and 2-aminoethylpiperazine. The following are particularly suitable aliphatic compounds containing tertiary nitrogen: N,N-dimethyl-1,3-propane diamine, N,N-diethyl-1,4-butane diamine and 2,2-dimethyl amino ethanol.

The catalysts (=compounds of type (Civ)) may be, for example, tertiary amines such as triethylamine, tributylamine, N-methyl-morpholine, N-ethyl-morpholine, N,N,N',N'-tetramethylethylene diamine, pentamethyl-diethylene triamine and higher homologues or 1,4-diazabicyclo(2,2,2)-octane, N-methyl-N'-dimethylamino ethylpiperazine, bis-(dimethylaminoalkyl)-piperazine, N,N-dimethylbenzylamine, N,N-dimethylcyclohexylamine, N,N-diethylbenzylamine, is-(N,N-diethylaminoethyl)-adipate, N,N,N',N'-tetramethyl-1,3-butane diamine, N,N-dimethyl-β-phenylethylamine, 1,2-dimethyl imidazole, 2-methyl imidazole, monocyclic and bicyclic amidines (see DE-OS No. 1,720,633), bis-(dialkylamino)-alkyl ethers (see U.S. Pat. No. 3,330,782, DE-AS No. 1,030,558, DE-OS No. 1,804,461 and DE-OS No. 2,618,280) and tertiary amines containing amide groups, preferably formamide groups, as described in DE-OS Nos. 2,523,633 and 2,732,292. Mannich bases of secondary amines such as dimethylamine and aldehydes, preferably formaldehyde, or ketones, preferably acetone, methylethyl ketone or cyclohexanol and phenols such as phenol, nonylphenol or bisphenol may also be used as catalysts. Sila-amines containing carbon-silicon bonds as described, for example, in DE-PS No. 1,229,292 (=U.S. Pat. No. 3,620,984) may also be used as catalyst. The following are examples: 2,2,4-trimethyl-2-silamorpholine and 1,3-diethylamino-methyl-tetramethyl-disiloxane. The catalysts may be nitrogen-containing bases such as tetraalkyl ammonium hydroxides, alkali metal hydroxides such as sodium hydroxide or potassium hydroxide, alkali metal phenolates such as sodium phenolate or alkali metal alcoholates such as sodium methylate. Hexahydrotriazines may also be used as catalysts.

Lactams and azalactams are also catalytically active. These generally first form an association with the compound containing active hydrogen. Such associations and their catalytic activities have been described in general terms in DE-OS Nos. 2,062,288, 2,062,289, 2,117,576 (=U.S. Pat. No. 3,758,444), 2,129,198, 2,330,175 and 2,330,211. Organic metal compounds may also serve as suitable catalysts, especially organic tin compounds such as di-n-octyl-tin mercaptide and tin(II) salts of carboxylic acids, e.g. tin acetate, tin octoate, tin ethylhexoate and tin laurate. Tin(IV) compounds are also suitable, e.g. dibutyl tin(IV) oxide, dibutyl tin(IV) dichloride, dibutyl tin(IV) diacetate, dibutyl tin(IV) dilaurate, dibutyl tin(IV) maleate and dioctyl tin(IV) diacetate.

Each of the catalysts may be used alone or in any mixtures with the others. Combinations of organic metal compounds with amidines, aminopyridines or hydrazopyridines are of particular interest (see DE-OS Nos. 2,434,185, 2,601,082 and 2,603,834.

Other catalysts which may be used according to the invention are described, for example, in Kunststoff-Handbuch, Volume VII, published by Vieweg and Hochtlen, Carl-Hanser-Verlag, Munich 1966, pages 96 to 102.

The polyisocyanate-polyaddition products according to the invention may in many cases be prepared without catalysts but the presence of catalysts is preferred.

The solvents used (=Component (Cv)) may be, for example, aromatic solvents such as xylene or toluene or solvents containing ester groups, such as butyl acetate or ethyl acetate.

Among the compounds of formulae (I) and (II), it is preferred to use those in which the alkylene oxide group AO contains from 2 to 12 carbon atoms, in particular from 2 to 3 carbon atoms, x has a value from 2 to 100, especially from 5 to 60, and the aliphatic polyester group $R_2$ has a molecular weight of from 300 to 3000, in particular from 600 to 2000.

Among the compounds of formula (III), it is preferred to use those in which the group $R_3$ has a molecular weight of from 400 to 5000, in particular from 400 to 2000.

Among the compounds of formula (IV), those in which y stands for a number from 5 to 30, in particular from 5 to 15, are preferred.

The preparation of the polyisocyanate polyaddition compounds according to the invention may be carried out, for example, by adding together the compounds of type A, the compounds of type B and optionally one or more compounds of type C in the quantities indicated and letting them react together at a temperature of from 20° to 250° C. The reaction is preferably carried out in the presence of solvents and catalysts.

The polyisocyanate-polyaddition compounds according to the invention may be used directly in the form in which they are obtained from their process of preparation, optionally after removal of solvent, as wetting or dispersing agents for the incorporation of solids, in particular of pigments, in lacquer and/or synthetic resin formulations or for the surface modification of solids before their incorporation in dispersions.

The polyisocyanate-polyaddition compounds according to the invention may be used, for example, in a quantity of from 0 1 to 20% by weight, based on the solids to be dispersed. The quantity is preferably from 0.5 to 10% by weight. The compounds according to the invention may either be applied to the solids before these are dispersed, in which case they modify the surfaces of the solids, or they may be added directly to the dispersing medium either before or together with the addition of the solid.

Addition of the compounds according to the invention in the form of solutions, e.g. to a lacquer system before its dispersion, may improve the flow properties and the colouristic properties of the lacquer system but better results may in some cases be obtained by using the compounds according to the invention in a solvent free form as far as possible. It is therefore generally preferred to apply the polyisocyanate-polyaddition compounds according to the invention to the solids before these are dispersed, these solids being generally inorganic or organic pigments. Such pigments are then generally suitable for universal application and the lacquer or polymer systems containing them have optimum flow properties and colouristic properties. Firm absorption on pigment surfaces is also obtained by applying the polyisocyanate-polyaddition compounds according to the invention in the aqueous phase. This enables interactions with other pigments during preparation of the lacquer and/or with other components of polymer compounds to be reduced.

Solvents for the polyisocyanate-polyaddition compounds according to the invention can easily be removed from aqueous systems, e.g. by distillation. It is advantageous to use the same solvents for the polyisocyanate-polyaddition compounds as those used in the finishing process for the pigment, e.g. in a tempering process for producing pigments with exceptional covering power. The application of polyisocyanate-polyaddition compounds to pigments in the aqueous phase is particularly simple to carry out if the solvents are at least partly water soluble.

The pigments which can be incorporated in lacquer systems and/or synthetic resin formulations by means of the polyisocyanete-polyaddition compounds according to the invention may be, for example, inorganc or organic pigments or carbon blacks. Examples of inorganic pigments include titanium dioxides, iron oxides and spinels. The following are examples of suitable organic pigments: azo pigments, azopigment lacquers such as pigments of the monoazo series, acetic acid derivatives, derivatives of 2,3-hydroxynaphthoic acid, 2,3-hydroxynaphthoic acid arylamide derivatives, pigments of the diazo series, derivatives of 3,3-dichlorobenzidine, diaryl types of yellow pigments, condensed diazo pigments, metal complex pigments, anthraquinoid pigments, phthalocyanine pigments and polycyclic pigments, especially those of the anthraquinone, thioindigo, quinacridone, dioxazine, pyrrolo-pyrrole, naphthalene tetracarboxylic acid, pterylene, isoamidoline and isoamidolinone, flavanthrone, pyranthrone or isoviolanthrone series.

$\beta$- and $\gamma$-crystal modifications of unsubstituted linear quinacridone and mixed crystals of 2,9-dimethyl quinacridone and unsubstituted quinacridones are preferred pigments.

Suitable lacquer systems include, for example, those based on alkyd/melamine, acrylic/melamine, acrylate/isocyanate and polyester/isocyanate. These may be prepared both from conventional formulations and according to methods for the preparation of high solid lacquers.

The polyisocyanate-polyaddition compounds according to the invention may be used not only for the dispersion of pigments but also for the dispersion and surface treatment of any fillers, especially in combination with their incorporation in synthetic resins. The fillers used may be, for example, kaolin, talc, other silicates, chalk, glass fibres, glass beads, quartz or metal powder and the synthetic resins may be rubbers, thermoplasts or duroplasts. The auxiliary substances according to the invention improve the flow properties of the filled synthetic resins and the dispersion of such fillers in synthetic resins.

The following examples illustrate the present invention. The parts and percentages given are parts by weight and percentages by weight unless otherwise indicated.

Examples of Preparation of
Polyisocyanate-Polyaddition Products

EXAMPLE 1

0.125 g of dibutyl tin dilaurate was added with stirring to a mixture of 131.5 g of a polyisocyanate with an average isocyanate equivalent weight of 262.5 which had been obtained by the trimerisation of 1,4-tolylene diisocyanate and 131.5 g of butyl acetate. After the mixture had been heated to 80° C., a solution in 600 g of xylene of 224 g of a product of addition of ethylene oxide to a phenol (OH number 56) which had been substituted with 2.7 mol of methyl styrene was added with stirring and stirring was continued for 3 hours at 80° C. 27.5 g of 3-dimethyl-aminopropylamine dissolved in 100 g of xylene were then added and stirring was continued for 1 hour at 80° C. 53 g of an octafunctional polyacrylic acid derivative containing hydroxyl groups (2% OH groups) dissolved in 203 g of xylene/butyl acetate (7:1) were then added and the mixture was stirred at 80° C. for 15 hours. The honey coloured product obtained could be used directly as dispersing agent. Its viscosity was 150 mPa.s at 23° C.

EXAMPLE 2

0.25 g of dibutyl tin dilaurate was added to a solution in 303 g of butyl acetate of 263 g of a polyisocyanate with an average isocyanate equivalent weight of 262.5 obtained by the trimerisation of 1,4-tolylene diisocyanate. After the reaction mixture has been heated to 80° C., 344 g of a polyester with an average OH number of 31.5 prepared from noctanol and caprolactone and dissolved in 800 g of xylene were added and the mixture was stirred at 80° C. for 3 hours. 78 g of a bifunctional polyethylene glycol with an average molecular weight of 1550 dissolved in 200 g of xylene were then added and stirring was continued for 2 hours at 80° C. After the addition of 60 g of 3-dimethylaminopropylamine dissolved in 544 g of xylene, stirring was continued for 1 hour and a solution of 210 g of an octafunctional polyacylic acid derivative containing hydroxyl groups in 1000 g of xylene/butyl acetate (9:1) was then added and stirring was continued for 16 hours at 80° C. The viscous product obtained (viscosity: 200 mPa.s at 23° C.) could be directly used as dispersing agent.

EXAMPLE 3

0.7 g of dibutyl tin dilaurate was added with stirring to a solution of 262.5 g of a polyisocyanate with an average isocyanate equivalent weight of 262.5 obtained by the trimerisation of 1,4-tolyene diisocyanate and 324 g of butyl acetate. A solution heated to 50° C. of 347 g of a monofunctional polyester of n-octanol and caprolactone (OH number 31.5) and 8 g of a commercial mixture of behenic and arachidic acid in 1000 g of xylene was then added with stirring at 80° C. and stirring was continued for 3 hours at 80° C. A solution of 77.5 g of polyethylene glycol having an average molecular weight of 1,550 in 200 g of xylene was then added. After 2 hours' stirring at 80° C., 58.8 g of 3-dimethylaminopropylamine dissolved in 740 g of xylene were added with stirring and stirring was then continued for 1 hour at 80° C. The solution obtained could be directly used as dispersing agent. Its viscosity was 50 mPa.s at 23° C.

EXAMPLE 4

The procedure was the same as that described in Example 2 but the polyisocyanate used consisted of 240 g of a trimerisation product of hexamethylene diisocyanate and 1,4-tolylene diisocyanate having an isocyanate equivalent weight of 240. The resulting product had a viscosity of 170 mPa.s at 23° C.

EXAMPLE 5

The procedure was the same as described in Example 3 but using 338 g of the polyisocyanate compound. The product obtained had a viscosity of 230 mPa.s at 23° C.

EXAMPLE 6

The procedure was the same as described in Example 2 but the polyfunctional hydroxyl compound used consisted of 101 g of a low molecular weight polyacrylic acid derivative (4.2% OH groups, number average molecular weight 4000). The resulting product had a viscosity of 260 mPa.s at 23° C.

EXAMPLE 7

The procedure was the same as described in Example 1 but using 196 g of monofunctional polyethylene glycol ether and 30 g of 3-dimethylaminopropylamine. The product obtained had a viscosity of 190 mPa.s at 23° C.

EXAMPLE 8

The procedure was the same as described in Example 2 but using 114.5 g of polyethylene glycol and 105 g of octafunctional polyacrylate polyol. The product obtained had a viscosity of 280 mPa.s at 23° C.

EXAMPLE 9

The procedure was the same as described in Example 3 but using 1-(2-hydroxyethyl)-morpholine as nitrogen compound. The product had a viscosity of 100 mPa.s at 23° C.

EXAMPLE 10

0.7 g of dibutyl tin dilaurate was added with stirring to a solution of 315 g of a polyisocyanate with an average isocyanate equivalent weight of 262.5 obtained from 1,4-tolylene diisocyanate by trimerisation and 324 g of butyl acetate.

A solution heated to 50° C. of 208 g of a monofunctional polyester of n-octanol and caprolactone (OH number 31.5) and 6.8 g of oleic acid in 1000 g of xylene was then added at 80° C. with stirring and stirring was continued for 3 hours at 80° C. A solution in 200 g of xylene of 93 g of polyethylene glycol having an average molecular weight of 1,550 was then added. After 2 hours' stirring at 80° C., 61 g of 3-dimethylaminopropylamine dissolved in 740 g of xylene were added with stirring. Stirring was then continued for 1 hour at 80° C. The solution obtained could be used directly as dispersing agent. Its viscosity was 210 mPa.s at 23° C.

EXAMPLE 11

The procedure was the same as described in Example 2 but using 70 g of N,N-dimethyl-1,3-propane diamine, 177 g of polycaprolactone polyester, and butyl acetate as solvent. The product obtained had a viscosity of 220 mPa.s at 23° C.

EXAMPLE 12

The procedure was the same as in Example 3 but using 293 g of polyisocyanate. The product obtained had a viscosity of 160 mPa.s at 23° C.

EXAMPLE 13

The procedure was the same as described in Example 5 but was carried out at 100° C. The product obtained had a viscosity of 180 mPa.s at 23° C.

EXAMPLE 14

The procedure was the same as described in Example 3 but 394 g of polyisocyanate were used. The product obtained had a viscosity of 60 mPa.s at 23° C.

EXAMPLES OF PRACTICAL APPLICATION

EXAMPLE A 50 g of a 42% press cake of γ-quinacridone were mixed with 3.4 g of a 25% solution in toluene/butyl glycol of the product prepared according to Example 2 and 150 ml of water, using a high speed stirrer, until a homogeneous product was obtained. This mixture was then dried in a circulating air drying cupboard at 60° C.

Full tone lacquers were prepared with this surface-treated γ-quinacridone. They were distinguished by their clear, fog free colour tone and excellent gloss.

The gloss was measured according to DIN 67 530 using an Erichsen Gardner Glossard apparatus. The angle of incidence of the light used for measuring was 20° and the reflectometer value obtained was 80. A comparison γ-quinacridone prepared by a method similar to that of Example A but without the addition of the additive gave a reflectometer value of 64.

The comparison colouring was distinctly duller and matter in the full tone and, what is particularly important for this purpose, it had less covering power.

EXAMPLE B

The procedure was the same as described in Example A but the additive used was the product prepared according to Example 3. The lacquer prepared with γ-quinacridone was similar in its properties to that obtained in Example A and was distinguished by its fog free full tone and better covering power. The gloss value determined with an Erichsen Cardner Clossard apparatus under an angle of incidence of 20° was 81.

EXAMPLE C

The procedure was the same as described in Example A but the additive according to Example 7 was used. The lacquer prepared with this γ-quinacridone was similar in its properties to that of Example B and was distinguished by its fog free full tone and improved covering power. The gloss value determined with an Erichsen Cardner Clossard apparatus at an angle of incidence of 20° was 81.

EXAMPLES D TO G

The pigments mentioned in the following Table 1 were treated as described in Example A. The gloss value was determined by the method mentioned in Example A and compared in each case with the gloss value of the lacquer film prepared with the untreated pigment.

TABLE 1

| Example | Pigment | Parts by weight of Pigment (dry basis) | Additive | Parts by weight of Additive (solid basis) | Gloss Value Example | Gloss Value Comparison |
|---|---|---|---|---|---|---|
| D | γ-quinacridone C.I.P.V. 19 | 20 | from Ex. 3 | 0.8 | 79 | 64 |
| E | Thioindigo C.I.P.R. 88 | 20 | from Ex. 8 | 0.8 | 80 | 62 |
| F | Perylenetetra-carboxylic acid-N,N'-bis-methyl diimide C.I.P.R. 179 | 20 | from Ex. 4 | 0.8 | 83 | 65 |
| G | 4,4'-diamino-1,1'-dianthraquinonyl C.I.P.R. 177 | 20 | from Ex. 6 | 0.8 | 80 | 69 |

EXAMPLE H 2.9 parts of a 25% solution of the additive which had been prepared as described in Example 5 were slowly added to 300 parts of an aqueous pigment suspension having a solids content of 6% of an already conditioned γ-quinacridone in a stirrer vessel.

The pigment suspension was stirred at room temperature for 4 hours and the solvents of the additive were then distilled off with steam and the pigment was filtered, washed with water and dried.

The modified γ-quinacridone obtained was distinguished by its excellent flow properties in alkyd resins. The highly covering full tone colours which are typical of this pigment were found to have a clear colour tone without fog and an excellent gloss.

A comparison pigment which had been prepared similarly but without the addition of the additive had a duller colour tone in the full tone lacquer and was more transparent and had a distinctly inferior gloss.

For a comparison of the gloss values, the two lacquers were prepared as follows:

15.0 g of the finely ground pigment were dispersed for 1 hour in 50.0 g of an alkyd resin solution consisting of 20.0 g of alkyd resin and 30.0 g of xylene, using a Red Devil. After the pigment had been dispersed, the pigment pastes obtained were vigorously mixed with a solution of 31.2 g of alkyd resin, 17.0 g of melamine resin, 4.0 g of glycol monobutyl ether, 2.1 g of butyl acetate, 16.8 g of xylene and 13.9 g of butanol to produce the final pigmented lacquers. The pigmented lacquers were applied to glass and stoved for 30 minutes at 130° C. The gloss values were determined with an Erichsen Gardner Glossard apparatus using light at an angle of incidence of 20°.

Pigment with additive according to the Example 5: 82 Comparison Example: 59

EXAMPLE I 15 g of a finely ground P.V. 19 of the gamma modification were dispersed for 1 hour on a Red Devil in 52.25 g of an alkyd resin solution consisting of 19.25 g of an alkyd resin, 30.0 g of xylene and 3 g of the additive solution prepared according to Example 5.

The final lacquer was prepared by the process according to Example H. The full tone lacquering was again distinguished by its fog free colour tone and excellent gloss.

The alkyd lacquer was also pigmented in analogous manner but without the addition of the additive. The full tone lacquering obtained was duller and more transparent and had a poorer gloss. The gloss values for the two lacquers, determined according to DIN 67 530 in an Erichsen Cardner Glossard apparatus, were as follows: Lacquer with additive according to Example 9: 80 Comparison Example (lacquer without additive): 57.

EXAMPLE J 15.0 g of a finely ground P.V. 19 of the gamma modification were dispersed for 1 hour on a Red Devil in 50.0 g of an alkyd resin solution consisting of 19.25 parts of alkyd resin, 0.75 g of the additive prepared according to Example 10 and 30.0 g of xylene. The pigment paste obtained was homogeneously mixed with a resin solution consisting of 31.2 g of alkyd resin, 17.0 g of melamine resin, 4.0 g of glycol monobutyl ether, 2.1 g of butyl acetate, 16.8 g of xylene and 13.9 g of butanol as described in Example H.

In a parallel experiment, 15.0 g of the same pigment were dispersed in an alkyd resin solution without additive, i.e. a solution of 20.0 g of alkyd resin and 30.0 g of xylene. A final lacquer was prepared by the same method. The two lacquers obtained were both applied to glass and stoved at 130° C. for 30 minutes They were found to differ in their gloss values: Lacquer with additive: 89 Lacquer without additive: 64.

The gloss was measured with a Cardner Glossard apparatus at an angle of incidence of 20° according to DIN 67 530.

EXAMPLE K 15 g of a C.I. pigment red 101 (C.I. number 77491) were dispersed in 50 g of an alkyd resin solution having the composition described in Example I. The final lacquer was again prepared by the process according to Example H.

The full tone lacquering was distinguished by its excellent gloss. The gloss had already fully developed when only 2% of the additive (based on the pigment) had been introduced.

What is claimed is:

1. Polyisocyanate-polyaddition compounds which are obtainable by the reaction of polyisocyanates containing from 3 to 8 isocyanate groups per molecule with
    (A) from 5 to 60 equivalents % (based on the isocyanate groups of the polyisocyanates put into the process) of one or more compounds selected from the group represented by the following formulae:

and

wherein
$R_1$ denotes an aliphatic group containing 1 to 60 carbon atoms, an aromatic or an araliphatic group containing 6 to 60 carbon atoms or the residue of a carboxylic acid, a carboxylic acid derivative or a sulphonamide containing from 1 to 60 carbon atoms,
AO denotes an alkylene oxide group containing from 2 to 22 carbon atoms,
x stands for a number from 0 to 200,
X denotes a HO, HS, $H_2N$ or HRN group in which $R=C_1$ to $C_6$ alkyl, and
$R_2$ denotes an aliphatic polyester group having a molecular weight in the range of from 200 to 10,000 and
(B) from 20 to 80 equivalents % (based on the isocyanate groups of the polyisocyanates put into the process) of a tertiary amine which has from 3 to 20 carbon atoms and in addition contains a HO, HS, $H_2N$ or HRN group in which $R=C_1$ to $C_6$ alkyl, the sum of (A)+(B) amounting to 40 to 98 equivalents % (based on the isocyanate groups of the polyisocyanates put into the process).

2. Polyisocyanate-polyaddition compounds which are obtainable by the reaction of polyisocyanates containing from 3 to 8 isocyanate groups per molecule with
    (A) from 5 to 60 equivalents % (based on the isocyanate groups of the polyisocyanates put into the process) of one or more compounds selected from the group represented by the following formulae:

$$R_1-(-AO-)_x-X \quad (I)$$

and $$R_1-R_2-X \quad (II)$$

wherein
$R_1$ denotes a substituted aliphatic group containing 1 to 60 carbon atoms, an aromatic or an araliphatic group containing 6 to 60 carbon atoms or the residue of a carboxylic acid, a carboxylic acid derivative or a sulphonamide containing from 1 to 60 carbon atoms,
AO denotes an alkylene oxide Sroup containing from 2 to 22 carbon atoms,
x stands for a number from 0 to 200,
X denotes a HO, HS, $H_2N$ or HRN group in which $R=C_1$ to $C_6$ alkyl, and
$R_2$ denotes an aliphatic polyester group having a molecular weight in the range of from 200 to 10,000 and
(B) from 20 to 80 equivalents % (based on the isocyanate groups of the polyisocyanates put into the process) of a tertiary amine which has from 3 to 20 carbon atoms and in addition contains a HO, HS, $H_2N$ or HRN group in which $R=C_1$ to $C_6$ alkyl, the sum of (A)+(B) amounting to 40 to 98 equivalents % (based on the isocyanate groups of the polyisocyanates put into the process).

3. Polyisocyanate-polyaddition compounds which are obtainable by the reaction of polyisocyanates containing from 3 to 8 isocyanate groups per molecule with
    (A) from 5 to 60 equivalents % (based on the isocyanate groups of the polyisocyanates put into the process) of one or more compounds selected from the group represented by the following formulae:

$$R_1-(-AO-)_x-X \quad (I)$$

and $$R_1-R_2-X \quad (II)$$

wherein

R₁ denotes an aliphatic group containing 1 to 60 carbon atoms, a substituted aromatic group or an araliphatic group containing 6 to 60 carbon atoms or the residue of a carboxylic acid, a carboxylic acid derivative or a sulphonamide containing from 1 to 60 carbon atoms, AO denotes an alkylene oxide group containing from 2 to 22 carbon atoms, x stands for a number from 0 to 200, X denotes a HO, HS, H₂N or HRN group in which R=C₁ to C₆ alkyl, and R₂ denotes an aliphatic polyester group having a molecular weight in the range of from 200 to 10,000 and (B) from 20 to 80 equivalents % (based on the isocyanate groups of the polyisocyanates put into the process) of a tertiary amine which has from 3 to 20 carbon atoms and in addition contains a HO, HS, H₂N or HRN group in which R=C₁ to C₆ alkyl, the sum of (A)+(B) amounting to 40 to 98 equivalents % (based on the isocyanate groups of the polyisocyanates put into the process).

4. Polyisocyanate-polyaddition compounds which are obtainable by the reaction of polyisocyanates containing from 3 to 8 isocyanate groups per molecule with (A) from 5 to 60 equivalents % (based on the isocyanate groups of the polyisocyanates put into the process) of one or more compounds selected from the group represented by the following formulae:

$$R_1-(-AO-)_x-X \quad (I)$$

and $$R_1-R_2-X \quad (II)$$

wherein

R₁ denotes an aliphatic group containing 1 to 60 carbon atoms, an aromatic or an araliphatic group containing 6 to 60 carbon atoms or the residue of a carboxylic acid, a carboxylic acid derivative or a sulphonamide containing from 1 to 60 carbon atoms, AO denotes an alkylene oxide group containing from 2 to 22 carbon atoms, x stands for a number from 0 to 200, X denotes a HO, HS, H₂N or HRN group in which R=C₁ to C₆ alkyl, and R₂ denotes an aliphatic polyester group having a molecular weight in the range of from 200 to 10,000 and (B) from 20 to 80 equivalents % (based on the isocyanate groups of the polyisocyanates put into the process) of a tertiary amine which has from 3 to 20 carbon atoms and in addition contains a HO, HS, H₂N or HRN group in which R=C₁ to C₆ alkyl, and (C) one or more components selected from the group consisting of (i) from 0 to 40 equivalents % (based on the isocyanate groups of the polyisocyanates put into the process) of one or more compounds corresponding to the formula $$X-R_3-X \quad (III)$$

wherein

R₃ denotes a group which formally is obtained by removal of the two OH end groups from a bifunctional polyether or polyester having a molecular weight in the range of from 200 to 10,000 and X in each case denotes, independently of the other and independently of the meaning of X in formulae (I) and (II), a HO, HS, H₂N or HRN group wherein R=C₁ to C₆ alkyl, and (ii) from 0 to 30 equivalents % (based on the isocyanate groups of the polyisocyanates put into the process) of a monofunctional carboxylic acid containing from 2 to 40 carbon atoms and (iii) from 0 to 50 equivalents % (based on the isocyanate groups of the polyisocyanates put into the process) of a polyfunctional compound corresponding to the following formula $$R_4-X)_y \quad (IV)$$

wherein

R₄ denotes a group which formally is obtained by the removal of y HO groups from a polyether polyol, a polyester polyol or a polyacrylate polyol with a molecular weight in the range of from 176 to 200,000 which has at least y HO groups, X denotes in each case, independently of the other and independently of the meaning of X in formulae (I), (II) and (III) an HO, HS, H₅N or HRN group in which R=C₁ to C₆ alkyl, and y stands for a number from 3 to 20, and (iv) from 0 0001 to 10% by weight (based on the total quantity of compounds containing isocyanate reactive hydrogen atoms put into the process) of one or more catalysts and (v) solvents, the sum of (A)+(B)+(Ci)+(Cii) amounting to 40 to 98 equivalents % and the sum of (A)+(B)+(Ci)+(Cii)+-(Ciii) amounting to 50 to 98 equivalents % or 102 to 150 equivalents % (based in each case on the isocyanate groups of the polyisocyanates put into the process).

5. A process for the preparation of polyisocyanate-polyaddition compounds, ln which polyisocyanates containing from 3 to 8 isocyanate groups per molecule and the following components are added together:

(A) from 5 to 60 equivalents % (based on the isocyanate groups of the polyisocyanates used) of one or more compounds selected from the group represented by the following formulae:

$$R_1-(-AO-)_x-X \quad (I)$$

and $$R_1-R_2-X \quad (II)$$

wherein

R₁ denotes an aliphatic group containing 1 to 60 carbon atoms, an aromatic or an araliphatic group containing 6 to 60 carbon atoms or the residue of a carboxylic acid, a carboxylic acid derivative or a sulphonamide containing from 1 to 60 carbon atoms AO denotes an alkylene oxide group containing from 2 to 22 carbon atoms, x stands for a number from 0 to 200, X denotes a HO, HS, H$_2$N or HRN group wherein R=C$_1$ to C$_6$ alkyl and R$_2$ denotes an aliphatic polyester group having a molecular weight in the range of from 200 to 10,000 and (B) from 20 to 80 equivalents % (based on the isocyanate groups of the polyisocyanates put into the process) of a tertiary amine which has from 3 to 20 carbon atoms and in addition contains a HO, HS, H$_2$N or HRN group in which R=C$_1$ to C$_6$ alkyl, and the sum of (A)+(B) amounting to 40 to 98 equivalents % (based on the isocyanate groups of the polyisocyanates put into the process) and reacted at temperatures from 20° to 250° C.

6. The process of claim 5, in which R$_1$ denotes a substituted aliphatic group containing 1 to 60 carbon atoms.

7. The process of claim 5, in which R$_1$ denotes a substituted aromatic group containing 6 to 60 carbon atoms.

8. The process of claim 5, in which further one or more components selected from the group consisting of (i) from 0 to 40 equivalents % (based on the isocyanate groups of the polyisocyanates put into the process) of one or more compounds corresponding to the formula $$X-R_3-X \qquad (III)$$

wherein

R$_3$ denotes a group which formally is obtained by removal of the two OH end groups from a bifunctional polyether or polyester having a molecular weight in the range of from 200 to 10,000 and X in each case denotes, independently of the other and independently of the meaning of X in formulae (I) and (II), a HO, HS, H$_2$N or HRN group wherein R=C$_1$ to C$_6$ alkyl, and (ii) from 0 to 30 equivalents % (based on the isocyanate groups of the polyisocyanates put into the process) of a monofunctional carboxylic acid containing from 2 to 40 carbon atoms and (iii) from 0 to 50 equivalents % (based on the isocyanate groups of the polyisocyanates put into the process) of a polyfunctional compound corresponding to the following formula $$R_4-X)_y \qquad (IV)$$

wherein

R$_4$ denotes a group which formally is obtained by the removal of y HO groups from a polyether polyol, a polyester polyol or a polyacrylate polyol with a molecular weight in the range of from 176 to 200,000 which has at least y HO groups, X denotes in each case, independently of the other and independently of the meaning of X in formulae (I), (II) and (III) an HO, HS, H$_5$N or HRN group in which R=C$_1$ to C$_6$ alkyl, and y stands for a number from 3 to 20, and (iv) from 0.0001 to 10% by weight (based on the total quantity of compounds containing isocyanate reactive hydrogen atoms put into the process) of one or more catalysts and (v) solvents, the sum of (A)+(B)+(Ci)+(Cii) amounting to 40 to equivalents % and the sum of (A)+(B)+(Ci)+(Cii)+(Ciii) amounting to 50 to 98 equivalents % or 102 to equivalents % (based in each case on the isocyanate groups of the polyisocyanates put into the process) are added.

9. A process for incorporating solids in lacquer formulations in which as wetting or dispersing agent a compound of claim 1 is used.

10. A process for incorporating solids in lacquer formulations in which as wetting or dispersing agent a compound of claim 2 is used.

11. A process for incorporating solids in lacquer formulations in which as wetting or dispersing agent a compound of claim 3 is used.

12. A process for incorporating solids in lacquer formulations in which as wetting or dispersing agent a compound of claim 4 is used.

13. A process for incorporating solids in lacquer formulations according to claim 9, in which 0.1 to 20 % by weight (based on said solids) of said wetting or dispersing agent is used.

14. A process for incorporating solids in synthetic resin formulations in which as wetting or dispersing agent a compound of claim 1 is used.

15. A process for incorporating solids in synthetic resin formulations in which as wetting or dispersing agent a compound of claim 2 is used.

16. A process for incorporating solids in synthetic resin formulations in which as wetting or dispersing agent a compound of claim 3 is used.

17. A process for incorporating solids in synthetic resin formulations in which as wetting or dispersing agent a compound of claim 4 is used.

18. A process for incorporating solids in synthetic resin formulations according to claim 14, in which 0.1 to 20 % by weight (based on said solids) of said wetting or dispersing agent is used.

19. A process for modifying the surface of solids before their incorporation into dispersions, in which a compound of claim 1 is used.

20. A process for modifying the surface of solids before their incorporation into dispersions, in which a compound of claim 4 is used.

21. A process for incorporating solids in lacquer formulations according to claim 10, in which 0.1 to 20% by weight (based on said solids) of said wetting or dispersing agent is used.

22. A process for incorporating solids in lacquer formulations according to claim 11, in which 0.1 to 20% by weight (based on said solids) of said wetting or dispersing agent is used.

23. A process for incorporating solids in lacquer formulations according to claim 12, in which 0.1 to 20% by weight (based on said solids) of said wetting or dispersing agent is used.

24. A process for incorporating solids in synthetic resin formulations according to claim 15, in which 0.1 to 20% by weight (based on said solids) of said wetting or dispersing agent is used.

25. A process for incorporating solids in synthetic resin formulations according to claim 16, in which 0.1 to 20% by weight (based on said solids) of said wetting or dispersing agent is used.

26. A process for incorporating solids in synthetic resin formulations according to claim 17, in which 0.1 to 20% by weight (based on said solids) of said wetting or dispersing agent is used.

* * * * *

UNITED STATES PATENT AND TRADEMARK OFFICE
CERTIFICATE OF CORRECTION

PATENT NO. : 4,929,705
DATED : May 29, 1990
INVENTOR(S) : Mazanek et al.

It is certified that error appears in the above-identified patent and that said Letters Patent is hereby corrected as shown below:

Col. 16, claim 2, line 45 — Delete " Sroup " and substitute -- group --

Col. 18, claim 4, line 26 — Delete " $R_4\text{-X})_y$ " and substitute -- $R_4\text{---}(\text{-X})_y$ --.

Col. 18, claim 4, line 39 — After " from " delete " 0 0001 " and substitute -- 0.0001 --

Col. 19, claim 8, line 53 — Delete " $R_4\text{-X})_y$ " and substitute -- $R_4\text{---}(\text{-X})_y$ --.

Col. 20, claim 8, line 4 — After " 40 to " insert -- 98 --

Col. 20, claim 8, line 6 — After " 102 to " insert -- 150 --

Signed and Sealed this

Eighteenth Day of February, 1992

Attest:

HARRY F. MANBECK, JR.

*Attesting Officer*     *Commissioner of Patents and Trademarks*